Jan. 31, 1967  J. F. COPLIN  3,300,976
COMBINED GUIDE VANE AND COMBUSTION EQUIPMENT
FOR BYPASS GAS TURBINE ENGINES
Filed Jan. 27, 1965
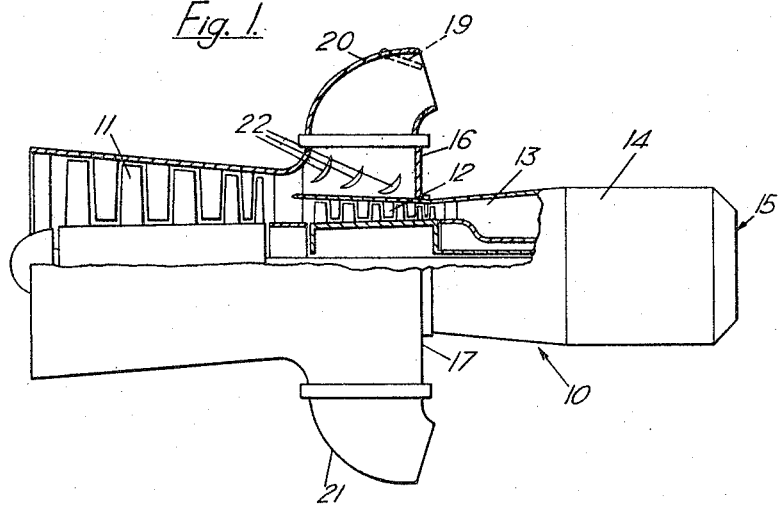
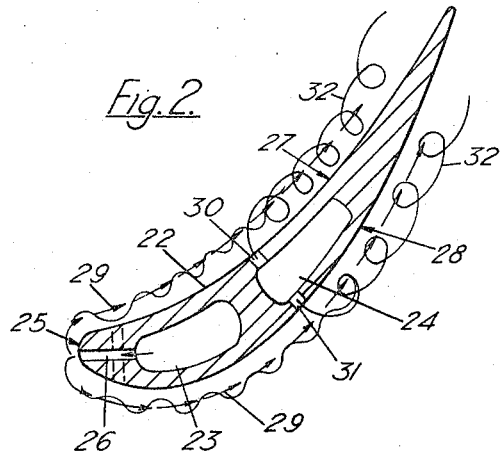
Inventor
John Frederick Coplin
By
Cushman, Darby & Cushman
Attorneys United States Patent Office 3,300,976
Patented Jan. 31, 1967

3,300,976
COMBINED GUIDE VANE AND COMBUSTION EQUIPMENT FOR BYPASS GAS TURBINE ENGINES
John Frederick Coplin, Littleover, Derby, England, assignor to Rolls-Royce Limited, Derbyshire, England, a company of Great Britain
Filed Jan. 27, 1965, Ser. No. 428,443
Claims priority, application Great Britain, Feb. 21, 1964, 7,470/64
6 Claims. (Cl. 60—224)

This invention concerns jet propulsion engines and, although not so restricted, it will hereinafter be described with reference to one aspect of gas turbine jet propulsion engines.

According to the present invention there is provided a gas turbine engine comprising in flow series compressor means, combustion equipment, turbine means and exhaust nozzle means, ducting connected to said compressor means for receiving compressed air therefrom, said ducting terminating in at least one nozzle which is rotatable to vary the direction of jet efflux therefrom, at least one gas-deflecting aerofoil-shaped guide vane over which air is adapted to flow laminarly, said guide vane being disposed in said ducting to deflect the compressed air into the nozzle, means for introducing fuel into the air stream to flow laminarly over the guide vane, and means located in said guide vane for introducing air under pressure into the laminar stream of fuel and air flowing over said guide vane to provide a turbulent, combustible fuel/air mixture.

According to another aspect of the invention there is provided a gas turbine jet propulsion engine comprising in flow series compressor means, combustion equipment, turbine means and exhaust nozzle means, ducting connected to said compressor means for receiving compressed air therefrom, said ducting terminating in at least one nozzle which is rotatable to vary the direction of jet efflux therefrom, a plurality of gas-deflecting aerofoil-shaped guide vanes over which air is adapted to flow laminarly, said guide vanes being disposed in and spaced across said ducting to deflect the compressed air, said guide vanes having a surface which defines orifices for introducing fuel into the air stream, and also defines apertures throuph which air under pressure may be introduced into the laminar stream of fuel and air flowing over the guide vanes to provide a turbulent, combustible fuel/air mixture.

Preferably said fuel is introduced into the airstream adjacent the leading edge of said guide vane. Thus the leading edge of said guide vane may be provided with a plurality of apertures through which fuel is adapted to flow into the airstream. Preferably said apertures communicate with a common duct in said member adapted to be connected to a source of fuel.

The movable propulsion nozzle may be supplied with compressed air directly from the or a compressor of said engine.

Preferably the ducting is disposed at an angle to the general flow of air leaving said compressor, said guide vanes aiding in turning the compressed air from said compressor into said ducting. The guide vanes may turn the compressed air through substantially 90°.

In a preferred embodiment, the engine is provided with two propulsion nozzles, and corresponding combustion equipment, the engine also being provided with conventional combustion equipment, turbine means and exhaust nozzle through which the remaining gases pass to atmosphere.

The invention also includes an aircraft provided with an engine as set forth above.

The invention is illustrated, merely by way of example, in the drawings accompanying the provisional specification, in which:

FIGURE 1 is a part sectional plan view of a gas turbine engine according to the present invention, and FIGURE 2 is a cross sectional plan of part of the combustion equipment shown is FIGURE 1.

Referring to the drawings, a gas turbine engine 10 comprises a low pressure compressor 11, high pressure compressor 12, combustion chamber 13, turbines 14, and exhaust nozzle 15 all arranged in axial flow series within a casing of the engine. Part of the air leaving low pressure compressor 11 flows through high pressure compressor 12, combustion chamber 13, turbines 14 and exhaust nozzle 15 to provide forward propulsion of the aircraft (not shown) in which the engine is installed.

Surrounding the high pressure compressor 12, on diametrically opposite sides thereof, are two ducts 16, 17 disposed at 90° to the axis of engine 10. To provide laminar flow of air from the outlet of compressor 11 into ducts 16, 17, sets of guide vanes 22 are disposed across ducts 16, 17, turning the gases through 90°. Rotatably mounted on the ends of ducts 16, 17 are propulsion nozzles 20, 21 which turn the gases flowing from ducts 16, 17 through substantially 90° and direct them rearwardly as shown in FIGURE 1. The nozzles 20, 21 are rotatabe about the axis of ducts 16, 17, and may therefore be pivoted to direct the gases flowing therethrough vertically downwardly (i.e. at right angles to the axis of engine 10), as well as rearwardly, as shown in FIGURE 1, forwardly of the engine, and in any intermediate position. When installed in a vertical take-off and landing (V.T.O.L) or short take-off and landing (S.T.O.L) aircraft, the nozzles 20, 21 provide the direct vertical thrust required, the gases exhausting through nozzle 15 being used solely for forward propulsion.

To increase the thrust provided by nozzles 20, 21 it is desirable to provide combustion equipment in ducts 16, 17 to thereby heat the air flowing therethrough by burning fuel in the air. In the present arrangement, the combustion equipment is constituted, at least in part, by the guide vanes 22. As shown in FIGURE 2, each guide vane 22 is provided with internal ducts 23, 24 which extend for the length of guide vane 22. Internal duct 23 is disposed adjacent leading edge 25 of the vane and a plurality of apertures 26 are drilled through the leading edge 25, communicating with duct 23. Provided along each surface 27, 28 of each guide vane 22 is a plurality of apertures 30, 31, respectively which all communicate with duct 24.

In normal operation of the engine 10, without the combustion equipment in ducts 16, 17 being used, the guide vanes 22, of aerofoil shape, turn the air leaving compressor 11 laminarly (i.e. substantially smoothly and without separation) through substantially 90° into ducts 16, 17. When it is desired to promote combustion of the air flowing through ducts 16, 17 internal duct 23 of each guide vane 22 is connected to a source of fuel and internal duct 24 is connected to a source of compressed air (e.g. tapped from high pressure compressor 12). The fuel flows through duct 23, and out through apertures 26, flowing over aerofoil surfaces 27, 28 and mixing with the air passing over the vanes as indicated by arrows 29. The air from duct 24 passes out through apertures 30, 31, flowing across the laminar fuel and air streams. The jets of air from apertures 30, 31 spoil the laminar flow over surfaces 27, 28 and thus cause turbulence of the fuel and air streams passing thereover as indicated at 32. The fuel and air thus mix to form a turbulent fuel/air mixture and, due to the reduction in speed of the mixture, and the numerous voids and eddies caused by the turbulent flow, an ignitable and combustible mixture is formed. Combustion of the mixture can be effected e.g. by an initial "hot shot" of fuel or by a catalytic igniter, and comtinuous combustion will then be provided until the fuel and air to ducts 23, 24 is cut off.

Nozzles 20, 21 are each provided with a pivoted flap 19 whereby the cross sectional areas of the nozzles may be readily varied.

It will be appreciated that the combustion equipment described above does not use gutters, as is usual in such instances, and a consequent saving in weight is achieved. Also, gutters, when not in use, and even when collapsed to reduce their effect on the air flow, still restrict the air ducts and reduce the effieciency of the ducts, since they cannot be removed from the ducts without undue difficulty. With the present arrangement, the "sheltered" zones normally provided by gutters are provided simply by the use of compressed air, and, by removing the supply of air, the sheltered zones are removed. The guide vanes 22 are used in any case, in ducts 16 and 17 of the engine, to achieve laminar (smooth and efficient) flow of gases to the nozzles 20, 21, and thus the combustion equipment makes use of existing components, and the additional equipment required is reduced to a minimum. The controls and actuators usually required to move gutters between operative and inoperative positions, are no longer required and thus a further saving in weight is achieved.

It will be appreciated that the combustion equipment described above, using aerofoil members to provide the sheltered zones normally provided by gutters, is not restricted to the arrangement described with reference to the drawings. The equipment could be used as reheat combustion equipment in the tail pipe of a vectorable jet engine. Thus, the vanes which space the pipe from the tail cone of the turbine, or any aerofoil members disposed in the jet pipe, may be used to provide the sheltered zones, as described above. Thus combustion equipment is provided which has a minimum restriction to gas flow when not in use, and requires the minimum quantity of materials and components even when in operation.

It will be appreciated that the equipment described may be readily varied. Thus the apertures 26 could be replaced by two sets of apertures, leading from duct 23 to each of the surfaces 27, 28, as indicated by dotted lines adjacent the leading edge 25. Also the fuel need not be supplied through the vane 22, but could be supplied by additional ducting adjacent the leading edge of the vanes. The laminar (smooth and unseparated) flow over the vanes 22 need not be spoiled by the use of compressed air, but mechanical flaps or similar devices could be used to provide turbulent flow over the vanes.

I claim:
1. A gas turbine engine comprising the combination of:
    compressor means, combustion equipment, turbine means and exhaust nozzle means, all in flow series,
    bypass ducting connected to said compressor means for receiving compressed air therefrom,
    at least one nozzle mounted at a terminal end of said bypass ducting, said nozzle being rotatable to vary the direction of jet efflux therefrom,
    at least one gas-deflecting, aerofoil-shaped guide vane over which air is adapted to flow laminarly, said guide vane being disposed in said ducting to deflect compressed air into said nozzle,
    means for introducing fuel into the air stream to flow laminarly over the guide vane, and
    means located in said guide vane for introducing air under pressure into the laminar stream of fuel and air flow over said guide vane to provide a turbulent, combustible fuel/air mixture.

2. A gas turbine engine as claimed in claim 1 wherein said ducting is disposed at an angle to the rotational axis of of the compressor means, and there are a pluralty of guide vanes spaced across the ducting, said guide vanes turning the compressed air through substantially 90°.

3. A gas turbine engine as claimed in claim 1 wherein said means for introducing fuel into the air stream is located in said at least one guide vane, the surface of the latter defining at least one orifice which is adapted to communicate with a source of fuel.

4. A gas turbine engine as claimed in claim 1 wherein said at least one guide vane is provided with a duct adapted to be connected to a source of compressed air, the surface of said at least one guide vane defining at least one aperture which communicates with said duct.

5. A gas turbine jet propulsion engine comprising in flow series compressor means, combustion equipment, turbine means and exhaust nozzle means, ducting connected to said compressor means for receiving compressed air therefrom, said ducting terminating in at least one nozzle which is rotatable to vary the direction of jet efflux therefrom, a plurality of gas-deflecting, aerofoil-shaped guide vanes over which air is adapted to flow laminarly, said guide vanes being disposed in and spaced across said ducting to deflect the compresed air, said guide vanes having a surface which defines orifices for introducing fuel into the air stream, and also defines apertures through which air under pressure may be introduced into the laminar stream of fuel and air flowing over the guide vanes to provide a turbulent, combustible fuel/air mixture.

6. A gas turbine jet propulsion engine as claimed in claim 5 wherein each said guide vane is provided with a common duct, a source of compressed air, said common duct communicating with said source of compressed air and with each said aperture.

References Cited by the Examiner

UNITED STATES PATENTS

| | | | |
|---|---|---|---|
| 2,296,023 | 9/1942 | Dallenbach et al. | 60—39.72 X |
| 2,607,191 | 8/1952 | Lee | 60—39.72 X |
| 2,660,859 | 12/1953 | Chamberlain | 60—39.72 |
| 2,771,743 | 11/1956 | Lovesey | 60—39.72 |
| 2,799,991 | 7/1957 | Conrad | 60—39.74 X |
| 2,979,899 | 4/1961 | Salmon et al. | 60—39.72 |
| 3,046,731 | 7/1962 | Cambel et al. | 60—39.72 X |
| 3,181,293 | 5/1965 | Orchard et al. | 60—35.55 |

FOREIGN PATENTS 1,128,043    8/1956    France.

CARLTON R. CROYLE, *Primary Examiner.*